(12) United States Patent
Ashton

(10) Patent No.: US 11,098,754 B2
(45) Date of Patent: Aug. 24, 2021

(54) BEARING AND PROCESS OF MAKING AND USING THE SAME

(71) Applicant: BorgWarner Inc., Auburn Hills, MI (US)

(72) Inventor: Zachary S. Ashton, Arden, NC (US)

(73) Assignee: BorgWarner Inc., Auburn Hills, MI (US)

(*) Notice: Subject to any disclaimer, the term of this patent is extended or adjusted under 35 U.S.C. 154(b) by 491 days.

(21) Appl. No.: 16/074,147

(22) PCT Filed: Jan. 26, 2017

(86) PCT No.: PCT/US2017/015089
§ 371 (c)(1),
(2) Date: Jul. 31, 2018

(87) PCT Pub. No.: WO2017/136217
PCT Pub. Date: Aug. 10, 2017

(65) Prior Publication Data
US 2021/0123473 A1    Apr. 29, 2021

Related U.S. Application Data

(60) Provisional application No. 62/290,111, filed on Feb. 2, 2016.

(51) Int. Cl.
*F16C 17/02*     (2006.01)
*F16C 17/18*     (2006.01)
*F16C 33/10*     (2006.01)

(52) U.S. Cl.
CPC ............ *F16C 17/028* (2013.01); *F16C 17/18* (2013.01); *F16C 33/1075* (2013.01); *F16C 2360/24* (2013.01)

(58) Field of Classification Search
CPC .... F16C 17/028; F16C 17/18; F16C 33/1075; F16C 2360/24; F16C 2220/60;
(Continued)

(56) References Cited

U.S. PATENT DOCUMENTS

| 2,796,659 | A | * | 6/1957 | Buske | ..................... C08K 5/098 |
|---|---|---|---|---|---|
| | | | | | 29/898.054 |
| 4,580,911 | A | * | 4/1986 | Burkhard | ................ F16C 17/03 |
| | | | | | 384/309 |
| 4,834,559 | A | * | 5/1989 | Kalvoda | ............. F16C 32/0651 |
| | | | | | 384/118 |

(Continued)

FOREIGN PATENT DOCUMENTS

| CN | 202012570 U | 10/2011 |
|---|---|---|
| CN | 102562802 A | 7/2012 |

(Continued)

OTHER PUBLICATIONS

Macolm E. Leader; Understanding Journal Bearings; 26 pages; Dec. 31, 2015.

(Continued)

*Primary Examiner* — Phillip A Johnson
(74) *Attorney, Agent, or Firm* — Young Basile Hanlon & MacFarlane, P.C.

(57) ABSTRACT

A bearing comprising an axial channel formed along a longitudinal axis of the bearing having an inner radius comprising an inner surface and an outer radius comprising an outer surface and at least one dam region formed on the inner surface of the inner radius of the channel wherein the dam region comprises a modified crescent shape between 90 and 180 degrees about the longitudinal axis of the channel.

18 Claims, 3 Drawing Sheets

(58) Field of Classification Search
CPC .............. F16C 2220/62; F16C 2220/66; F16C 2220/70; B23B 5/36
See application file for complete search history.

(56) References Cited

U.S. PATENT DOCUMENTS

| | | | | |
|---|---|---|---|---|
| 5,593,230 | A | * | 1/1997 | Tempest ................ F16C 17/028 384/100 |
| 5,628,567 | A | * | 5/1997 | Murabe .............. F16C 33/1075 384/100 |
| 6,402,385 | B1 | | 6/2002 | Hayakawa et al. |
| 7,441,957 | B2 | | 10/2008 | Hong et al. |
| 7,836,601 | B2 | | 11/2010 | El-Shafei |
| 8,646,979 | B2 | | 2/2014 | Kashchenevsky |
| 2005/0188798 | A1 | * | 9/2005 | Bischof ............... F16C 32/0489 82/1.11 |
| 2006/0078239 | A1 | * | 4/2006 | Dimofte ................ F16C 17/047 384/100 |
| 2010/0143104 | A1 | | 6/2010 | Furman et al. |
| 2011/0200422 | A1 | | 8/2011 | Gutknecht |
| 2014/0010647 | A1 | * | 1/2014 | Nishida .................. F16C 17/26 415/229 |
| 2014/0254963 | A1 | | 9/2014 | Blair et al. |
| 2015/0219152 | A1 | | 8/2015 | Ward |
| 2015/0330442 | A1 | * | 11/2015 | Futae ...................... F16C 17/18 415/111 |
| 2016/0223014 | A1 | * | 8/2016 | Nakamura .............. F16C 33/14 |
| 2017/0009810 | A1 | * | 1/2017 | Futae ...................... F02B 33/40 |

FOREIGN PATENT DOCUMENTS

| | | | |
|---|---|---|---|
| CN | 102808847 B | 4/2015 | |
| CN | 104526546 A | 4/2015 | |
| CN | 104747597 A | 7/2015 | |
| DE | 102011018625 A1 | 10/2012 | |
| JP | S5943219 A | 3/1984 | |
| JP | 2013079591 A * | 5/2013 | .............. F16C 27/02 |
| WO | 2015034695 A1 | 3/2015 | |
| WO | 2015153206 A1 | 10/2015 | |

OTHER PUBLICATIONS

Mehta; Performance of Three-Lobe Pressure Dam Bearings; Science Direct, vol. 26, Issue 6, Dec. 1993 ; pp. 435-442.

Flack; An Experimental Investigation on the Response of a Flexible Rotor Mounted in Pressure Dam Bearings; Oct. 1980 ; vol. 102 Journal of Mechanical Design; pp. 842-850.

Salamone; Journal Bearing Design Types and Their Applications to Turbomachinery; pp. 179-190.

International Search Report and Written Opinion; dated Mar. 28, 2017; for International Application No. PCT/US2017/015089; 11 pages.

Chinese Office Action dated Jun. 14, 2019; Application No. 201780017829.4; Applicant: BorgWarner Inc.; 18 pages.

EP Office Action dated Sep. 10, 2019; Application No. 17703623.3-1013; Applicant: BorgWarner Inc.; 4 pages.

* cited by examiner

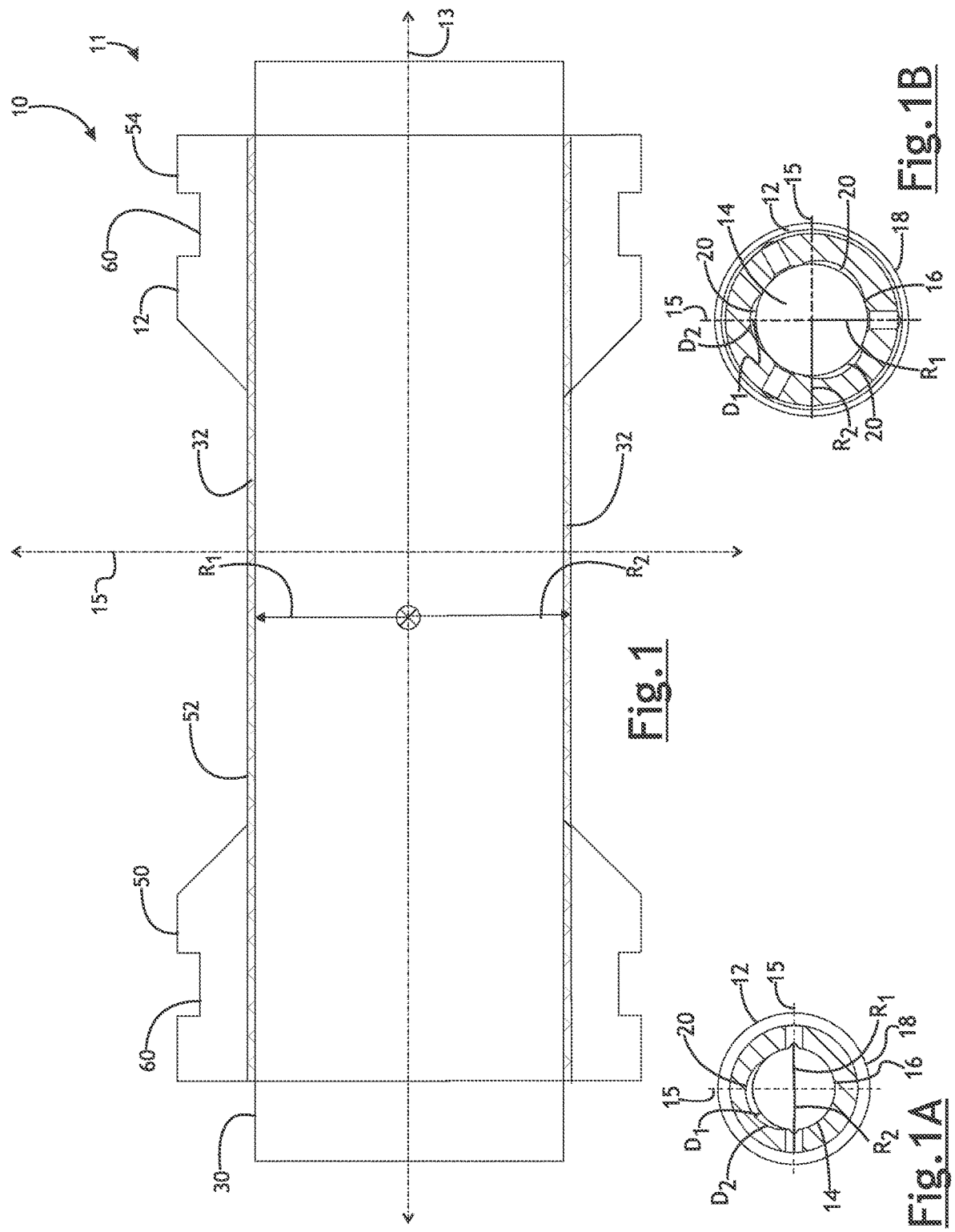

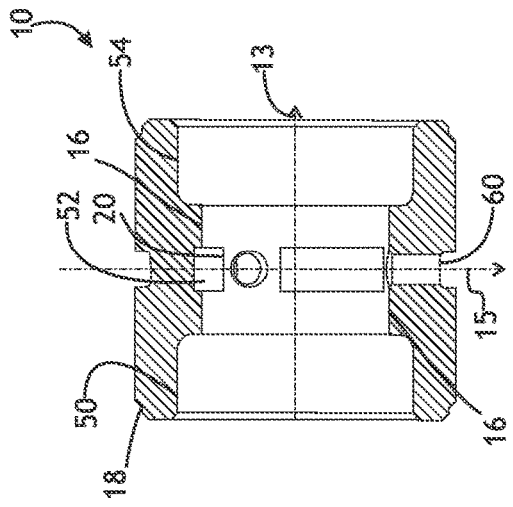
Fig.2A
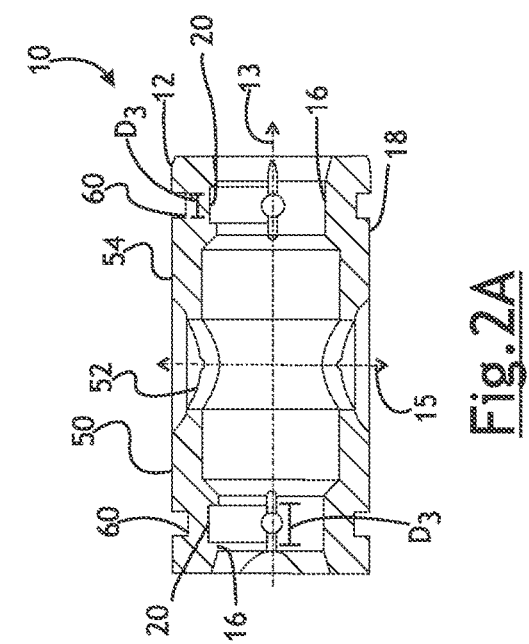
Fig.2B
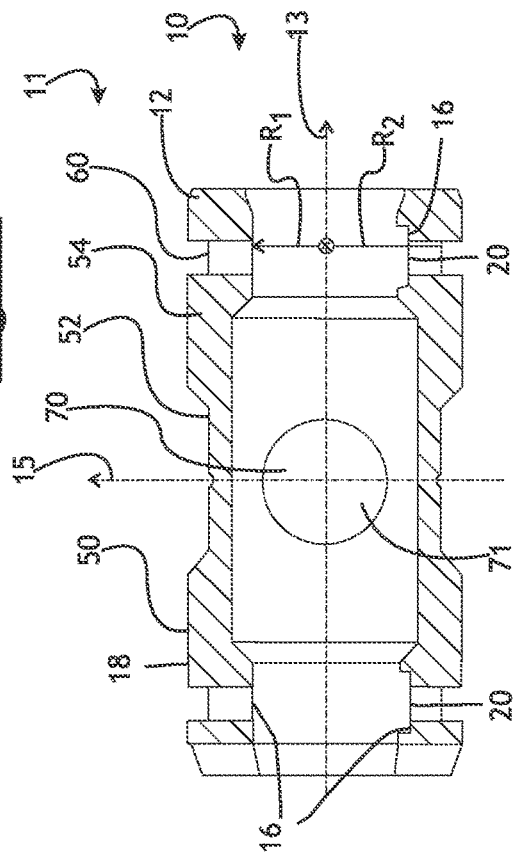
Fig.3A
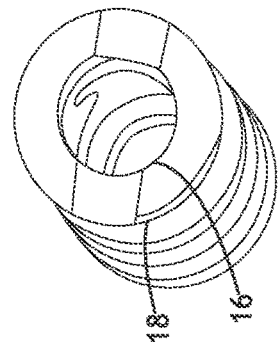

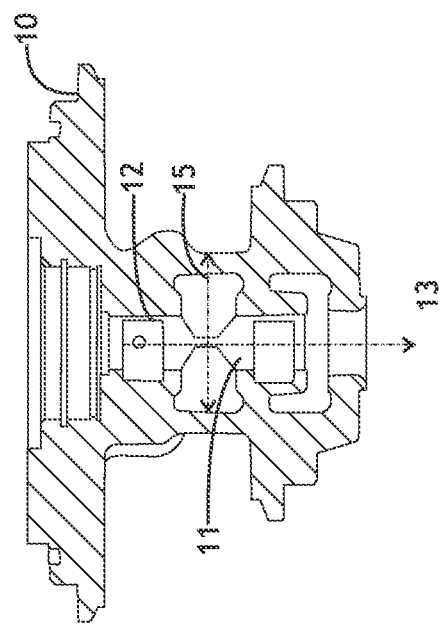
Fig. 3B
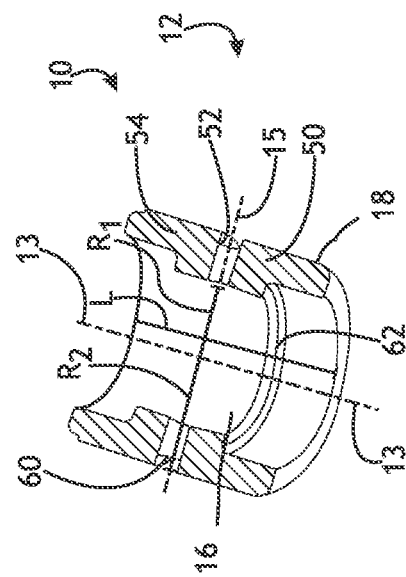
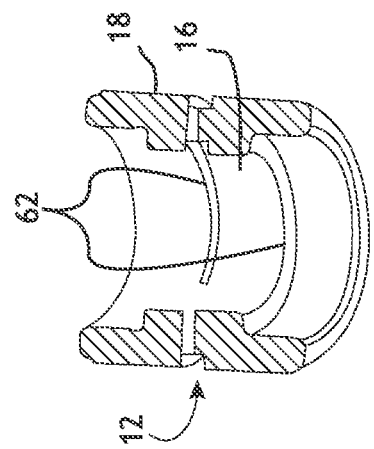
Fig. 3C
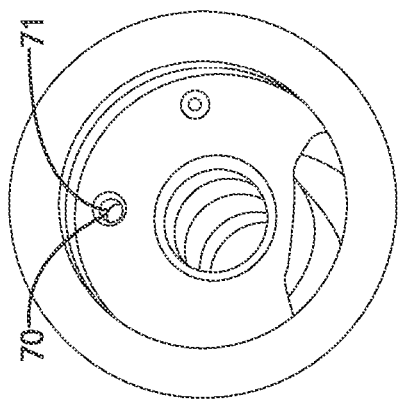
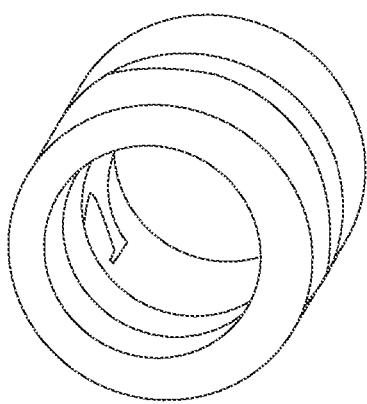

BEARING AND PROCESS OF MAKING AND USING THE SAME

CROSS-REFERENCE TO RELATED APPLICATIONS

This application is a U.S. national phase application filed under 35 U.SC. § 371 of International Application No. PCT/US2017/015089, filed on Jan. 26, 2017, which claims the benefit of U.S. Provisional Application No. 62/290,111 filed Feb. 2, 2016.

TECHNICAL FIELD

The field to which the disclosure generally relates to includes bearing components used in bearing assemblies.

BACKGROUND

A number of bearing assemblies may be used to facilitate rotors in components including, but not limited to, turbochargers.

SUMMARY OF ILLUSTRATIVE VARIATIONS

A number of variations may include a product comprising: a bearing comprising an axial channel formed along a longitudinal axis of the bearing having an inner radius comprising an inner surface and an outer radius comprising an outer surface and at least one dam region formed on the inner surface of the inner radius of the channel wherein the dam region comprises a modified crescent shape between 90 and 180 degrees about the longitudinal axis of the channel.

A number of variations may include a method comprising: providing a bearing assembly comprising a rotor, a bearing comprising an axial channel formed along a longitudinal axis of the bearing having an inner radius comprising an inner surface and an outer radius comprising an outer surface and at least one dam region formed on the inner surface of the inner radius of the channel wherein the dam region comprises a modified crescent shape between 90 and 180 degrees about the longitudinal axis of the channel, and a fluid film between the rotor and the bearing; and rotating the rotor within the bearing such that the dam region provides for an axial fluid film flow modification.

A number of variations may include a method comprising: providing a bearing comprising an axial channel formed along a longitudinal axis of the bearing having an inner radius comprising an inner surface and an outer radius comprising an outer surface; and machining the inner surface to provide at least one dam region formed on the inner surface of the channel wherein the dam region comprises a modified crescent shape between 90 and 180 degrees about the longitudinal axis of the channel.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates an axial view of a product according to a number of variations.

FIG. 1A illustrates a radial cross-sectional view of a product according to a number of variations.

FIG. 1B illustrates a radial cross-sectional view of a product according to a number of variations.

FIG. 2A illustrates an axial view of a product according to a number of variations.

FIG. 2B illustrates an axial view of a product according to a number of variations.

FIG. 3A illustrates an axial view and a perspective radial cross-sectional view of a product according to a number of variations.

FIG. 3B illustrates an axial view and a radial cross-sectional view of a product according to a number of variations.

FIG. 3C illustrates two axial cross-sectional views and a perspective radial cross-sectional view of a product according to a number of variations.

DETAILED DESCRIPTION OF ILLUSTRATIVE VARIATIONS

The following description of the variations is merely illustrative in nature and is in no way intended to limit the scope of the invention, its application, or uses.

FIG. 1 shows a product 10 according to a number of variations. In a number of variations, the product 10 may include a bearing 12. In a number of variations, the bearing 12 may be a component of a bearing assembly 11. In a number of variations, the bearing 12 may include a primary or longitudinal axis 13. In a number of variations, the bearing 12 may include a bearing length L. In a number of variations, the bearing 12 may include a radial axis 15. In a number of variations, the bearing 12 may include a channel 14 formed along the primary or longitudinal axis 13 of the bearing 12. In a number of variations, the channel 14 or bearing 12 may have an inner radius R1 and the inner radius R1 may meet an inner surface 16 of the channel 14 at the bearing 12 along the radial axis 15. In a number of variations, the channel 14 or bearing 12 may have an outer radius R2 and the outer radius R2 may comprise an outer surface 18 of the bearing 12 along the radial axis 15. In a number of variations, the bearing 12 may include at least one dam region 20. In a number of variations, the dam region 20 may be formed on the inner surface 16 of the inner radius R1 of the channel 14 or the bearing 12. In a number of variations, the dam region 20 may include a modified crescent shape. In a number of variations, the modified crescent shape geometry may be defined as having at least one area of steadily decreasing inner radius R1 of the channel 14, followed by at least one apex or area of the lowest inner radius R1 of the modified crescent shape in the channel 14, followed by at least one area of steadily increasing inner radius R1 of the channel 14. In a number of variations, the modified crescent shape geometry may be defined as having one area of steadily decreasing inner radius R1 of the channel 14, followed by one apex or area of the lowest inner radius R1 of the modified crescent shape in the channel 14, followed by one area of steadily increasing inner radius R1 of the channel 14. In a number of variations, the modified crescent shape geometry may include a plurality of each of the areas and/or a plurality of apexes. In a number of variations, the dam region 20 may be located between 90 and 180 degrees about the longitudinal axis of the channel 14. In a number of variations, the bearing 12 may include a plurality of dam regions 20. In a number of variations, the bearing assembly 11 may further comprise a rotor 30. In a number of variations, the rotor 30 may be at least partially housed within the channel 14 of the bearing 12. In a number of variations, the rotor 30 may rotate within the bearing in a clockwise or counterclockwise direction about the longitudinal axis of the channel 14 formed within the bearing. In a number of variations, the bearing assembly 11 may further comprise a fluid film 32. In a number of variations, the fluid film 32 may comprise at least one of an oil, gasoline, kerosene, jet fuel, water, coolant, or may be another type. In a number of variations, the fluid film 32 may be at least partially housed within the channel 14 of the bearing 12. In a number of variations, the fluid film 32 may reduce friction between rotation of the rotor 30 and the bearing 12 in the bearing assembly 11 as rotation of the rotor 30 creates an axial fluid flow profile of the fluid film 32 within the bearing assembly 11. In a number of variations, as the rotor 30 spins within the bearing 12 it develops a pressure field between the rotor 30 and the bearing 12. In a number of variations, this pressure field may develop cross-coupled stiffness between the rotor 30 and the bearing 12. In a number of variations, this cross-coupled stiffness may result in whirling of the rotor 30 within the bearing 12. In a number of variations, this may result in sub synchronous motion of the rotor 30 within the bearing 12 which may lessen the durability and produce unfavorable noise characteristics of the bearing assembly 11 while increasing vibration noise during rotation. In a number of variations, the dam region 20 may be constructed and arranged to provide for fluid film flow profile modification. In a number of variations, the fluid flow profile modification may be defined as a fluid flow profile that will result in greater static eccentricity and reduced cross-coupled stiffness that results in a stable rotor response at light static loads and high rpm depending on the application of the bearing assembly 11.

In a number of variations, the bearing 12 or bearing assembly 11 may be a component of a turbocharger. In a number of variations, the turbocharger may be a component of a vehicle and may increase output of an engine system within the vehicle. In a number of variations, the vehicle may include a motor vehicle, watercraft, spacecraft, aircraft, or may be another type. In a number of variations, the bearing 12 or bearing assembly 11 may be a semi-floating bearing. In a number of variations, the bearing 12 or bearing assembly 11 may be a fully-floating bearing. In a number of variations, the bearing 12 or bearing assembly 11 may be a journal bearing, bushing, sleeve bearing, rifle bearing, standard cylindrical bore bearing, profiled journal bearing, elliptical bearing, multi-lobe taper land bearing, offset bore bearing, roller thrust bearing, ball thrust bearing, roller bearing, ball bearing, magnetic bearing, flexture bearing, combinations thereof, or may be another type. In a number of variations, the bearing 12 or bearing assembly 11 may include a fluid film bearing, including the vertically inclined fixed geometry bearing, the horizontally inclined fixed geometry bearing, the tilting housing bearing, the upper tilted half bearing, the inclined pressure dam bearing, the inclined multi-lobed bearing, the converging-diverging bearing, the diverging converging bearing, the converging bearing, the diverging bearing, and the axially tilting bad Bearing, variations or combinations thereof, or may be another type.

In a number of variations, the bearing 12 may have a cylindrical shape. In a number of variations, the bearing 12 may have a truncated cone shape. In a number of variations, the bearing 12 may have a cross-sectional shape profile including, but not limited to, a circle, a triangle, a parallelogram, a square, a rhombus, a pentagon, a pentacle, a hexagon, a polygon, or may be another shape. In a number of variations, the bearing 12 may be a number of different shapes to fit its desired application, including, but not limited to, a hollow half cone, a hollow cube, a hollow cuboid, a hollow 3-D shape with a polygonal cross-section, a hollow half pyramid, a hollow prism, or may be another type. In a number of variations, the bearing 12 may be tapered along its length. In a number of variations, the bearing 12 may be filled in for a narrower cross section at points along its length. In a number of variations, the bearing 12 may be constructed to fit its desired application.

In a number of variations, all components of the bearing assembly 11 may be made of the components (metallic, polymeric) that the bearing 12 or rotor 30 would include. In a number of variations, the components of the bearing assembly 11 may comprise a material including, but not limited to, plastic, steel, stainless steel, copper, nickel, tin, noble metals, zinc, iron, bronze, aluminum, silicon, titanium, platinum, shellac, amber, aramid (including Twaron, Kevlar, Technora, Nomax), silk, leather, rubber, natural rubber, synthetic rubber, silicone rubber, fluoroelastomer rubber, butyl rubber (isobutylene-isoprene), hypalon rubber (chlorosulphonated polyethylene), epichlorohydrin rubber (epichlorohydrin), ethylene propylene diene rubber, fluorocarbon rubber, fluorosilicone rubber, hydrogenated nitrile rubber, nitrile rubber, perfluoroelastomer rubber, polyacrylic rubber, chloroprene rubber, polyurethane rubber, styrene butadiene rubber, acrylonitrile-butadiene rubber, hydrogenated acrylonitrile-butadiene rubber, ethylene acrylic rubber, phenol formaldehyde, polyether urethane, polyester urethane, neoprene, nylon, polyvinyl chloride, polystyrene, polyethylene, polypropylene, polyurethane, polybenzimidazoles, polyacrylonitrile, PVB, silicone, bioplastic, Teflon, PET, PP, PVDC, PA PTFE, PEO, PPY, PANI, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), metallic alloys, brass, combinations thereof, or may be another type.

In a number of variations, as shown in FIGS. 1 and 2, the bearing 12 may include a number of different regions along its longitudinal direction along the longitudinal axis 13. In a number of variations, the bearing 12 may include a first longitudinal bearing region 50. In a number of variations, as shown in FIG. 1, FIGS. 2A, 2B, and FIG. 3C, the bearing 12 may include a second longitudinal bearing region 52. In a number of variations, the bearing 12 may include a third longitudinal bearing region 54. In a number of variations, the second longitudinal bearing region 52 may have a smaller outer radius R2 and a larger inner radius R1 than either of the first longitudinal bearing region 50 or the third longitudinal bearing region 54. In a number of variations, the second longitudinal bearing region 52 may have a larger outer radius R2 and a smaller inner radius R1 than either of the first longitudinal bearing region 50 or the third longitudinal bearing region 54. In a number of variations, the second longitudinal bearing region 52 may have the same outer radius R2 and/or the same inner radius R1 than either of the first longitudinal bearing region 50 or the third longitudinal bearing region 54. In a number of variations, at least one of the first longitudinal bearing region 50, the second longitudinal bearing region 52, or the third longitudinal bearing region 54 may contain at least one outer surface groove 60 cut into the outer surface 18 of the bearing 12. In a number of variations, this outer surface groove 60 may be cut along the longitudinal axis 13. In a number of variations, this outer surface groove 60 may be cut along the radial axis 15. In a number of variations, the outer surface groove 60 may be cut anywhere from $0 \geq X \geq 360°$ in the annular direction around the outer surface 18 of the bearing 12 at any point along the longitudinal axis 13 of the bearing 12. In a number of variations, the outer surface groove 60 may run down at least a portion of the bearing 12 in the longitudinal direction 13. In a number of variations, as shown in FIG. 4, at least one of the first longitudinal bearing region 50, the second longitudinal bearing region 52, or the third longitudinal bearing region 54 may contain at least one inner surface groove 62 cut into the inner surface 16 of the bearing 12. In a number of variations, this inner surface groove 62 may be cut along the longitudinal axis 13. In a number of variations, this inner surface groove 62 may be cut along the radial axis 15. In a number of variations, the inner surface groove 62 may be cut anywhere from $0 \geq X \geq 360°$ in the annular direction around the inner surface 16 of the bearing 12 at any point along the longitudinal axis 13 of the bearing 12. In a number of variations, the inner surface groove 62 may include an annular groove cut into the inner surface 16 of the inner radius R1. In a number of variations, the inner surface groove 62 may run down at least a portion of the bearing 12 in the longitudinal direction 13. In a number of variations, as shown in FIG. 3, the bearing may include a bore 70 cut into the outer surface 18 of the bearing 12 and extending through the channel 14. In a number of variations, the bore 70 may be cut through both outer surfaces 18, 18' of the bearing 12 and form a hole 71 in the bearing 12. In a number of variations, the bore 70 or hole 71 may be parallel to the radial axis 15 of the bearing 12. In a number of variations, the bore 70 or hole 71 may be offset from the radial axis 15 of the bearing 12. In a number of variations, as shown in FIG. 3, the bearing 12 may have varying inner diameters R1 along the length L of the bearing 12 along the longitudinal axis 13. FIG. 3A illustrates a non-limiting example of a semi-floating bearing 12. FIG. 3B illustrates a non-limiting example of a fully floating bearing 12. FIG. 3C illustrates a non-limiting example of a fully floating bearing 12 with a view of a floating busing.

In a number of variations, the dam region 20 may include a modified crescent shape. As shown in FIGS. 1A and 1B, at least one dam region 20 may be included around the inner surface 16 of the bearing 12 at varying locations. In a number of variations, as shown In FIG. 1B, the bearing 12 may include three dam regions 20 annularly spaced along the inner surface 18 of the inner radius R1 at 120 degree intervals. In a number of variations, the dam region 20 may have a dam apex amplitude of length D1. In a number of variations, the dam region 20 may have an arc length D2. In a number of variations, the dam region 20 may have an axial length of D3. In a number of variations, the axial length may be between $40\% \geq x \geq 80\%$ of the bearing length L. In a number of variations, the modified crescent shape may include a truncated crescent shape. In a number of variations, the modified crescent shape may include a two-dimensional cross-section shape in the radial direction 15 including, but not limited to, a circle, a triangle, a parallelogram, a square, a rhombus, a pentagon, a pentacle, a hexagon, a polygon, or may be another shape. In a number of variations, the dam region 20 may protrude along the inner surface 16 in the radial direction 15. In a number of variations, the dam region 20 may retreat along the inner surface 16 in the radial direction 15. In a number of variations, as shown in FIG. 3C, the dam region 20 may include an inner surface groove 62.

In a number of variations, the bearing 12 or bearing assembly 11 may be manufactured by machining. In a number of variations, the bearing 12 or bearing assembly 11 may be formed through metal forming, forging, molding, flow forming, rolling, extrusion, laser cladding, metalworking, sintering, fabrication, welding, molding, brazing, casting, extrusion, forging, heat treatment, hydroforming, punching, shearing, spinning, or may be formed another way. In a number of variations, the inner surface 16 of the inner radius R1 inside the channel 14 may be machined to form at least one dam region 20. In a number of variations, the machining of the inner radius R1 may be done along a machining path. In a number of variations, the machining path may be formed through at least one of metal forming, forging, molding, flow forming, rolling, extrusion, laser cladding, metalworking, sintering, fabrication, welding, molding, brazing, casting, extrusion, forging, heat treatment, hydroforming, punching, shearing, spinning, spinning, snipping, sawing, roll slitting, reaming, plasma cutting, punch press, milling cutter, jigsaw, laser cutting, chamber reamer, diamond tooling, die, dremel, holing, ironworking, counterboring, countersinking, broaching, burring, or may be formed another way. In a number of variations, the dam region 20 may be formed along a shorter machining path in the radial direction. In a number of variations, the dam region 20 may be formed using a large machining tool. In a number of variations, this may increase the efficiency of forming a dam region 20 in the bearing 12 compared to other dam regions not including a modified crescent shape.

In a number of variations, a method 800 is shown. In a number of variations, the method 800 may include in block 802 providing a bearing assembly 11 comprising a rotor 30, a bearing 12 comprising an axial channel 14 formed along a longitudinal axis 13 of the bearing 12 having an inner radius R1 comprising an inner surface 16 and an outer radius R2 comprising an outer surface 18 and at least one dam region 20 formed on the inner surface 16 of the channel 14 wherein the dam region 20 comprises a modified crescent shape between 90 and 180 degrees about the longitudinal axis 13 of the channel 14, and a fluid film 32 between the rotor 30 and the bearing 12. In a number of variations, the method 800 may further include, in block 804, rotating the rotor 30 within the bearing 12 such that the dam region 20 provides for an axial fluid film flow modification.

In a number of variations, a method 900 is shown. In a number of variations, the method 900 may include in block 902 providing a bearing 12 comprising an axial channel 14 formed along a longitudinal axis 13 of the bearing 12 having an inner radius R1 comprising an inner surface 16 and an outer radius R2 comprising an outer surface 18. In a number of variations, the method 900 may further include, in block 904, machining the inner surface 16 to provide at least one dam region 20 formed on the inner surface 16 of the channel 14 wherein the dam region 20 comprises a modified crescent shape between 90 and 180 degrees about the longitudinal axis 13 of the channel 14.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a bearing comprising an axial channel formed along a longitudinal axis of the bearing having an inner radius comprising an inner surface and an outer radius comprising an outer surface and at least one dam region formed on the inner surface of the inner radius of the channel wherein the dam region comprises a modified crescent shape between 90 and 180 degrees about the longitudinal axis of the channel.

Variation 2 may include a product as set forth in Variation 1 wherein the bearing further comprises a fluid film and wherein the dam region is constructed and arranged to provide for an axial fluid film flow modification.

Variation 3 may include a product as set forth in any of Variations 1-2 wherein the bearing comprises a semi-floating bearing.

Variation 4 may include a product as set forth in any of Variations 1-3 wherein the bearing comprises a fully-floating bearing.

Variation 5 may include a product as set forth in any of Variations 1-4 wherein the dam region comprises an annular groove cut into the inner surface of the inner radius.

Variation 6 may include a product as set forth in any of Variations 1-5 wherein the bearing is a component of a turbocharger of a vehicle.

Variation 7 may include a product as set forth in any of Variations 1-6 wherein an axial length of the dam region is between 40 and 80% of an axial length of the bearing.

Variation 8 may include a product as set forth in any of Variations 1-7 wherein the fluid film comprises an oil.

Variation 9 may include a product as set forth in any of Variations 1-8 wherein the bearing comprises three dam regions annularly spaced along the inner surface of the inner radius at 120 degree intervals.

Variation 10 may include a product as set forth in any of Variations 1-9 wherein the bearing comprises a cylindrical shape.

Variation 11 may include a method comprising: providing a bearing assembly comprising a rotor, a bearing comprising an axial channel formed along a longitudinal axis of the bearing having an inner radius comprising an inner surface and an outer radius comprising an outer surface and at least one dam region formed on the inner surface of the inner radius of the channel wherein the dam region comprises a modified crescent shape between 90 and 180 degrees about the longitudinal axis of the channel, and a fluid film between the rotor and the bearing; and rotating the rotor within the bearing such that the dam region provides for an axial fluid film flow modification.

Variation 12 may include a method as set forth in Variation 11 wherein the bearing comprises a semi-floating bearing.

Variation 13 may include a method as set forth in any of Variations 11-12 wherein the bearing comprises a fully-floating bearing.

Variation 14 may include a method as set forth in any of Variations 11-13 wherein the dam region comprises an annular groove cut into the inner surface of the inner radius.

Variation 15 may include a method as set forth in any of Variations 11-14 wherein the bearing is a component of a turbocharger of a vehicle.

Variation 16 may include a method as set forth in any of Variations 11-15 wherein an axial length of the dam region is between 40 and 80% of an axial length of the bearing.

Variation 17 may include a method as set forth in any of Variations 11-16 wherein the bearing comprises three dam regions annularly spaced along the inner surface of the inner radius at 120 degree intervals.

Variation 18 may include a method as set forth in any of Variations 11-17 wherein the bearing comprises a cylindrical shape.

Variation 19 may include a method comprising: providing a bearing comprising an axial channel formed along a longitudinal axis of the bearing having an inner radius comprising an inner surface and an outer radius comprising an outer surface; and machining the inner surface to provide at least one dam region formed on the inner surface of the channel wherein the dam region comprises a modified crescent shape between 90 and 180 degrees about the longitudinal axis of the channel.

Variation 20 may include a method as set forth in Variation 20 wherein the machining the inner surface to provide at least one dam region further comprises machining over a limited radial machining.

The above description of select variations within the scope of the invention is merely illustrative in nature and, thus, variations or variants thereof are not to be regarded as a departure from the spirit and scope of the invention.

What is claimed is:

1. A product comprising:
a bearing comprising an axial channel formed along a longitudinal axis of the bearing having an inner radius comprising an inner surface and an outer radius comprising an outer surface and at least one dam region formed on the inner surface of the inner radius of the channel wherein the dam region comprises a modified crescent shape between 90 and 180 degrees about the longitudinal axis of the channel, wherein an axial length of the dam region is between 40% and 80% of an axial length of the bearing.

2. The product as set forth in claim 1 wherein the bearing further comprises a fluid film and wherein the dam region is constructed and arranged to modify flow of the fluid film through the bearing.

3. The product as set forth in claim 2 wherein the fluid film comprises an oil.

4. The product as set forth in claim 1 wherein the bearing comprises a semi-floating bearing.

5. The product as set forth in claim 1 wherein the bearing comprises a fully-floating bearing.

6. The product as set forth in claim 1 wherein the dam region comprises an annular groove cut into the inner surface of the inner radius.

7. The product as set forth in claim 1 wherein the bearing is a component of a turbocharger of a vehicle.

8. The product as set forth in claim 1 wherein the bearing comprises three dam regions annularly spaced along the inner surface of the inner radius at 120 degree intervals.

9. The product as set forth in claim 1 wherein the bearing comprises a cylindrical shape.

10. A method comprising:
providing a bearing assembly comprising rotor, a bearing comprising an axial channel formed along a longitudinal axis of the bearing having an inner radius comprising an inner surface and an outer radius comprising an outer surface and at least one dam region formed on the inner surface of the inner radius of the channel wherein the dam region comprises a modified crescent shape between 90 and 180 degrees about the longitudinal axis of the channel, and a fluid film between the rotor and the bearing, wherein an axial length of the dam region is between 40% and 80% of an axial length of the bearing; and
rotating the rotor within the bearing such that the dam region modifies flow of the fluid film through the bearing assembly.

11. The method as set forth in claim 10 wherein the bearing comprises a semi-floating bearing.

12. The method as set forth in claim 10 wherein the bearing comprises a fully-floating bearing.

13. The method as set forth in claim 10 wherein the dam region comprises an annular groove cut into the inner surface of the inner radius.

14. The method as set forth in claim 10 wherein the bearing is a component of a turbocharger of a vehicle.

15. The method as set forth in claim 10 wherein the bearing comprises three dam regions annularly spaced along the inner surface of the inner radius at 120 degree intervals.

16. The method as set forth in claim 10 wherein the bearing comprises a cylindrical shape.

17. A method comprising:
providing a bearing comprising an axial channel formed along a longitudinal axis of the bearing having an inner radius comprising an inner surface and an outer radius comprising an outer surface; and
machining the inner surface to provide at least one dam region formed on the inner surface of the channel wherein the dam region comprises a modified crescent shape between 90 and 180 degrees about the longitudinal axis of the channel and wherein an axial length of the dam region is between 40% and 80% of an axial length of the bearing.

18. The method as set forth in claim 17 wherein machining the inner surface to provide at least one dam region further comprises machining over a limited radial machining path.

\* \* \* \* \*